United States Patent [19]

Hiramatsu et al.

[11] Patent Number: 4,974,068
[45] Date of Patent: Nov. 27, 1990

[54] APPARATUS FOR READING A FILM IMAGE WITH A PHOTOELECTRIC CONVERTING ELEMENT AND FOR ADJUSTING THE GAIN OF SAID ELEMENT

[75] Inventors: Akira Hiramatsu; Yuichi Sato; Tokuichi Tsunekawa, all of Yokohama; Makoto Katsuma, Wako; Takeshi Kobayashi, Yokohama; Shigeki Yamada, Yokohama, all of Japan

[73] Assignee: Canon Kabushiki Kaisha, Tokyo, Japan

[21] Appl. No.: 13,119

[22] Filed: Feb. 10, 1987

[30] Foreign Application Priority Data

Feb. 14, 1986 [JP] Japan ................................ 61-31687
Feb. 14, 1986 [JP] Japan ................................ 61-31688

[51] Int. Cl.$^5$ ............................................. H04N 5/253
[52] U.S. Cl. ...................................... 358/75; 358/54; 358/214
[58] Field of Search ....................... 358/43, 44, 54, 29, 358/29 C, 75, 214, 80

[56] References Cited

U.S. PATENT DOCUMENTS 4,418,358 11/1983 Poetsch et al. ....................... 358/80
4,495,516 1/1985 Moore et al. ......................... 358/54
4,679,073 7/1987 Hayashi ............................... 358/80
4,734,762 3/1988 Aoki et al. ........................... 358/80
4,755,875 7/1988 Fremont ............................. 358/214
4,837,450 6/1989 Satomura et al. ................... 250/571

Primary Examiner—James J. Groody
Assistant Examiner—Kim Yen Vu
Attorney, Agent, or Firm—Fitzpatrick, Cella, Harper & Scinto

[57] ABSTRACT

There is a film image information reading apparatus called a film scanner. This apparatus comprises: a lighting optical system to illuminate a film document; a photoelectric conversion element, such as a CCD to convert the image information of the film document into the electric signal; and an adjusting circuit to adjust the output of the photoelectrical conversion element such that a predetermined density of the film document is output as an output of almost the saturation level of that element. The predetermined density is the color density of the base color of a negative film. The adjusting circuit may control the charge storage period, gain, or output level of the photoelectric conversion element. With this apparatus, the positive image can be easily derived by reversing the negative image without considering the base color of the negative film and the image signal of a high quality can be obtained.

4 Claims, 15 Drawing Sheets

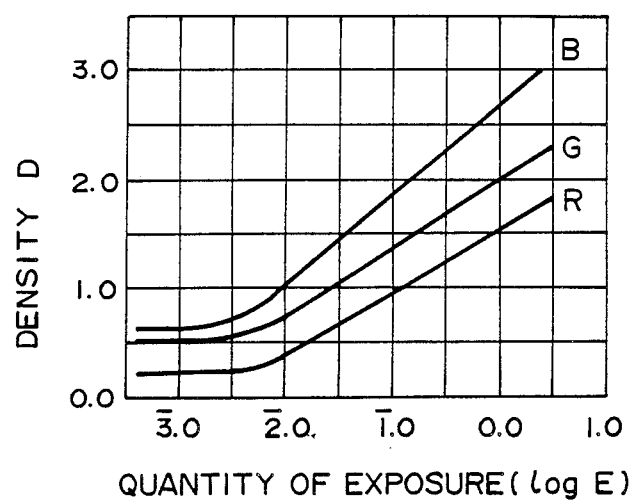
F I G. 2

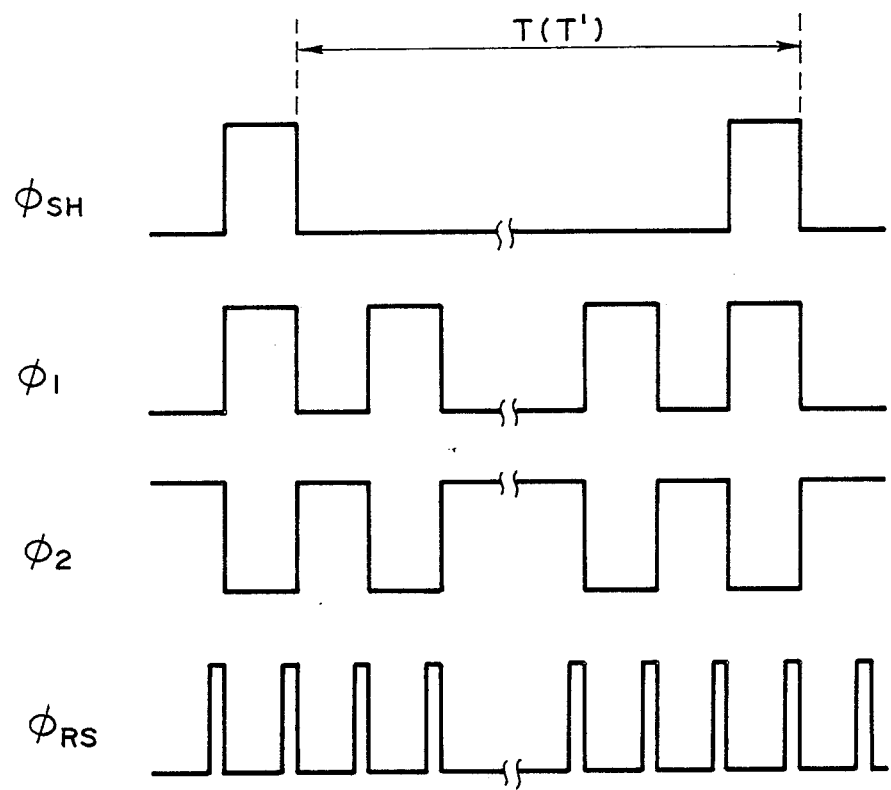
F I G. 8

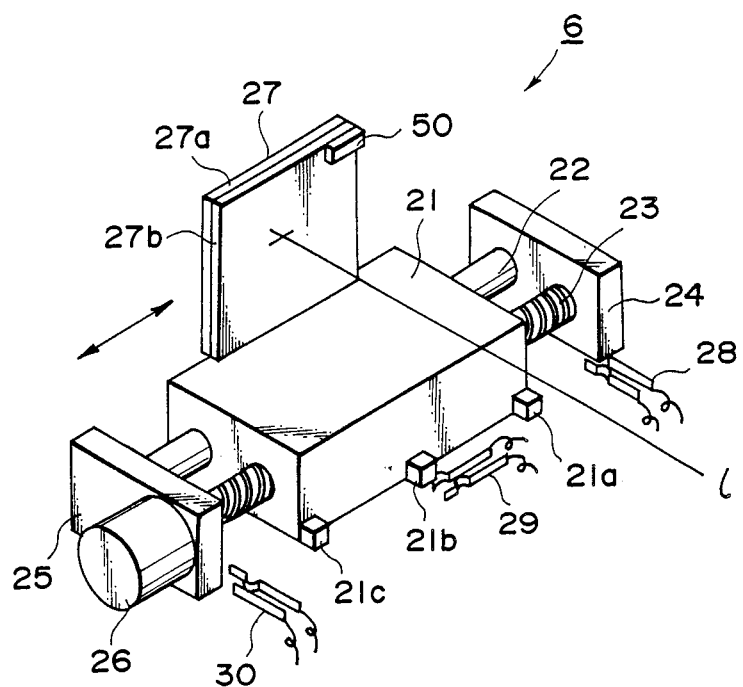
F I G. 13

APPARATUS FOR READING A FILM IMAGE WITH A PHOTOELECTRIC CONVERTING ELEMENT AND FOR ADJUSTING THE GAIN OF SAID ELEMENT

BACKGROUND OF THE INVENTION

1. Field of the Invention

The present invention relates to a film image information reading apparatus (ordinarily, referred to as a film scanner) for reading image information of a film by a photoelectric conversion element and, more particularly, to the adjustment of a gain of an output level of the photoelectric conversion element when the image of a negative film is read.

2. Related Background Art

Hitherto, there has generally been known a color scanner (color image information reading apparatus) in which various color information of a color document is separated into three primary colors of, e.g., R (red), G (green), and B (blue), and three kinds of image signals corresponding to the respective color separation images are obtained from the photoelectric conversion element, and the color information of the color document is reproduced by synthesizing those three kinds of image signals.

However, if a film such as photographic film, microfilm, or the like is used as a document, in general, the density range of the film is fairly wide to be above 3. In particular, if a self scan type sensor such as a CCD (charge coupled device) or the like is used as the photoelectric conversion element of the color scanner, the density range of the film is fairly wider than the dynamic range of the sensor. Therefore, the image signal read by such a sensor is largely adversely influenced and a problem occurs. Practically speaking, there is such a problem that the gradation of the portion having a high or low density of the film image is not reproduced.

On the other hand, if a color negative film is used as a document, as shown by film characteristic curves of FIG. 2, the density of each layer of R, G, and B in the unexposed portions is considerably large. Therefore, it will be appreciated that the color negative film is constituted in such a manner that the negative image is reproduced on the orange base portion. In other words, in the case of the negative film the mixed image information consisting of the true image information and the color information of the film base portion which is unconcerned with the image information is read as the color image signal. Therefore, the dynamic range of the sensor is not effectively used. In addition, in the case of the negative film, the negative image is formed. When the negative image is reversed to the positive image, the density of the base portion is reduced, so that the density information of the base portion is quite the meaningless image information. Further, the orange components of the base portion of the document slightly differs in dependence on the film maker, kind of film, or developing state of the film, causing a problem when the accurate color is reproduced.

SUMMARY OF THE INVENTION

The present invention is made in consideration of the foregoing problems and it is an object of the invention to provide a film image information reading apparatus which can eliminate the foregoing drawbacks.

Another object of the invention is to provide a film image information reading apparatus which can reverse a negative image to a positive image by only the simple reversing process.

According to one embodiment of the invention, it is an object of the invention to provide a film image information reading apparatus including adjustment means for adjusting the gain of the output of a photoelectric conversion element in such a manner that a predetermined density of a film document can be output as substantially the saturation level output of the photoelectric conversion element.

According to another aspect of the invention, it is an object of the invention to provide a film image information reading apparatus comprising: density measurement means for measuring the density of the base portion of a film document and generating the output signal corresponding to the density; and control means for controlling the output level or gain of a photoelectric conversion element of the basis of the output signal of the density measuring means.

The above and other objects and features of the present invention will become apparent from the following detailed description and the appended claims with reference to the accompanying drawings.

BRIEF DESCRIPTION OF THE DRAWINGS

FIG. 2 is a characteristic curve diagram showing the relation between the quantity of exposure of a general color negative film and the density;

FIG. 8 is a timing chart showing the timings of main control signals of a sensor driver 106 in FIG. 7;

FIG. 13 is a perspective view showing an example of a constitution of a sub scan system of the second embodiment;

DETAILED DESCRIPTION OF THE PREFERRED EMBODIMENTS

An embodiment of the present invention will be described in detail hereinbelow with reference to the drawings.

Figure 1:
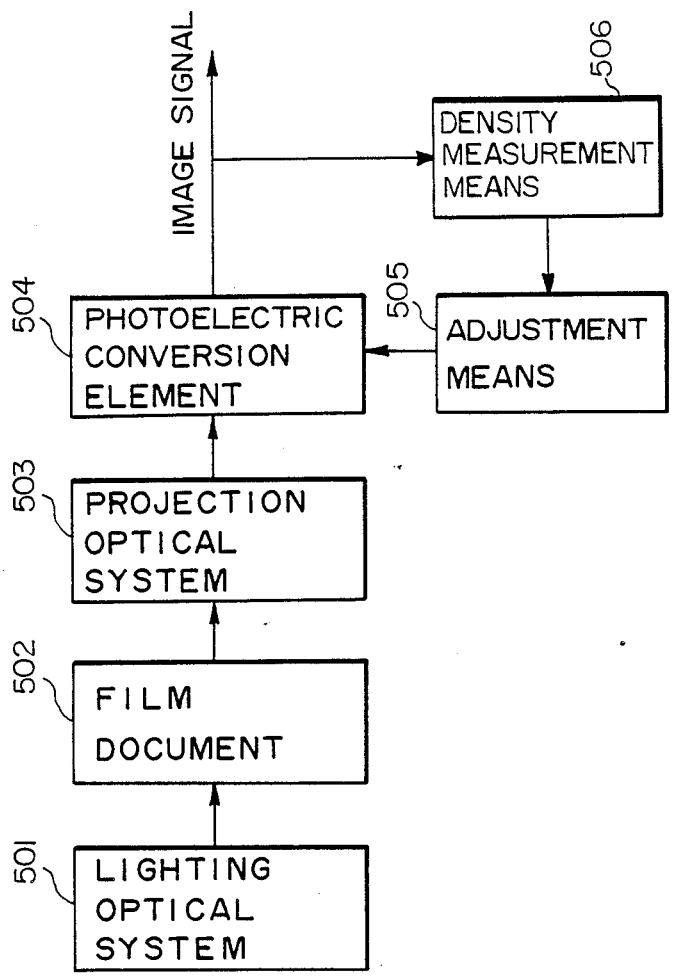
FIG. 1 is a block diagram showing a fundamental configuration of the first embodiment of the present invention.

FIG. 1 shows a fundamental configuration of the first embodiment of the invention.

In FIG. 1, 501 denotes a lighting optical system such as a lamp or the like; 502 is a film document which is illuminated by the lighting optical system; and 503 is a projection optical system to lead the image of the film document 502 to a photoelectric conversion element 504. Adjustment means 505 controls the output level of the photoelectric conversion element 504 and adjusts the gain of the output of the element 504 in such a manner that a predetermined density of the film document 502 is output as a saturation level output of the element 504, a density measurement means 506 for measuring density of a base film document.

Figure 3:
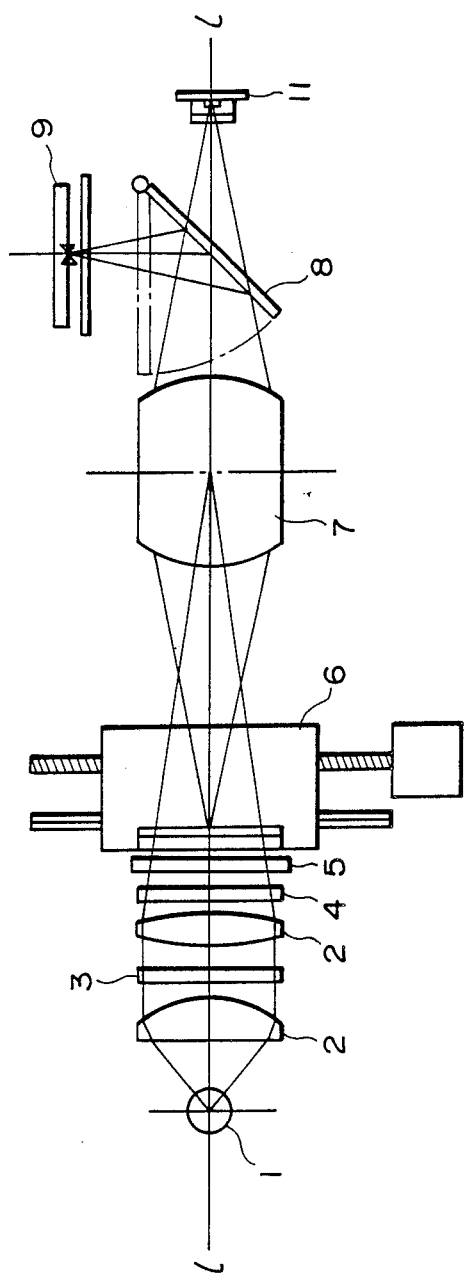
FIG. 3 is a diagram showing a schematic of a film scanner of the first embodiment.

FIG. 3 shows a schematic constitution of a film scanner of the embodiment of the invention.

In FIG. 3, reference numeral 1 denotes a lighting lamp 1 to illuminate the film document; 2 represents condenser lenses to condense the illumination light; 3 is an infrared cut filter to remove the infrared light. The lighting system is constituted by the lamp 1, lenses 2, and filter 3. Numeral 4 denotes a filter exchanging mechanism, which will be explained hereinafter in conjunction with FIG. 6; 5 is a shutter mechanism, which will be explained hereinafter with reference to FIG. 5; and 6 is a sub scan system, which will be explained hereinafter in FIG. 4. The sub scan system 6 sequentially scans the film document in the direction which is substantially perpendicular to the optical axis, i.e., in the vertical direction (sub scan direction) of the drawing. Numeral 7 denotes a projection lens to form an image of the transmitted light of the film document onto a sensor 11 (FIG. 3). The projection lens 7 has the zoom function which can change the projection magnification.

Numeral 8 represents a total reflection mirror which is rotatable around a pivotal axis as a rotational center. When observing through a finder, the mirror 8 is located on the optical path (at the position indicated by a solid line in FIG. 3). When the film is being scanned, the mirror 8 is driven and disposed at the position indicated by an alternate long and short dash line in the diagram by a well-known drive mechanism, e.g., rotary plunger or the like. Numeral 9 shows a focusing plate of the finder and is used when the user observes the film document. The sensor 11 is the charge storage type line sensor of the self scan type such as a CCD or the like. The sensor 11 is arranged in the direction perpendicular to the optical axis and in the vertical direction (main scan direction) of the drawing which is deviated from the scan direction (subscan direction) of the sub scan system 6 by an angle of 90°. 1—1 denotes the optical axis.

Figure 4:
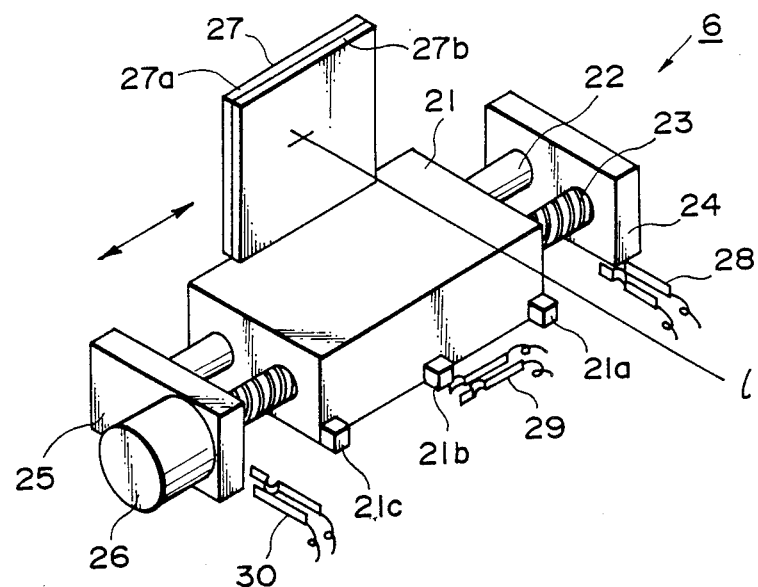
FIG. 4 is a perspective view showing an example of a sub scan system 6 in FIG. 3.

FIG. 4 shows an example of a detailed configuration of the sub scan system 6 in FIG. 3. In the diagram, reference numeral 21 denotes a scan unit (carriage) which is supported so as to be movable in the direction (sub scan direction) indicated by an arrow in the diagram; 22 is a guide rail to support the scan unit 21 in the moving direction (sub scan direction) of an arrow: 23 a feed screw which is rotated by a drive motor 26, which will be explained hereinafter, and drives the scan unit 21; and 24 and 25 are supporting units to support at both ends the rail 22 and feed screw 23 to a base plate (not shown).

Numeral 26 denotes a drive motor to rotate the feed screw and drive the scan unit 21 in the direction indicated by arrows in the diagram. The drive motor 26 is a stepping motor designed to drive the feed screw in a stepwise manner in accordance with the reading pitch of the sensor 11. A film document holder 27 is fixed onto the scan unit 21 and moves integrally with the scan unit 21. Numerals 27a and 27b denote a pair of glass plates of the holder 27. The film document is sandwiched between the glass plates 27a and 27b, thereby keeping the film document in a flat state.

Numerals 28, 29, and 30 represent switches to detect the scan start position, central position, and scan end position of the scan unit 21, respectively. These switches are turned ON to OFF (opened or closed) by corresponding projecting portions 21a, 21b, and 21c which are integrally formed at three positions of the side surface of the scan unit 21. Namely, when the first switch 30 is ON, the scan unit 21 is located at the start position. When the third switch 28 is ON, the scan unit 21 is located at the scan end position. When the user observes the whole image plane through the focusing plate (ie., finder) 9, the central position is detected by the switch 29.

Figure 5:
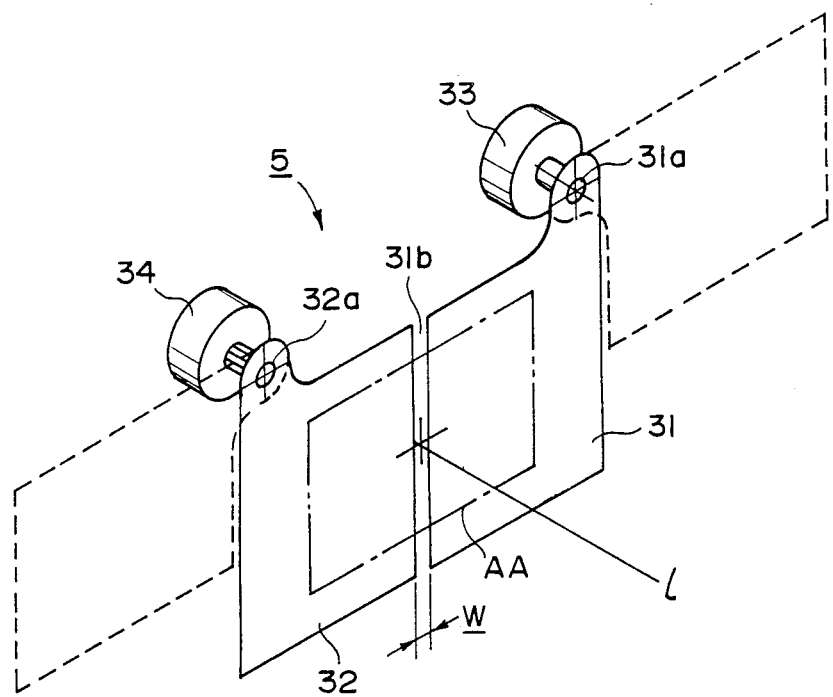
FIG. 5 is a perspective view showing an example of a shutter mechanism 5 in FIG. 3.

FIG. 5 shows a detailed configuration of the shutter mechanism 5 in FIG. 3. In the diagram, reference numerals 31 and 32 denote light shielding plates which are supported so as to be rotatable around rotary shafts 31a and 32a as rotational centers, respectively; and 33 and 34 indicate rotary plungers to rotate the light shielding plates 31 and 32 through the rotary shafts 31a and 32a, respectively. An image plane range AA of the film document is shown by an alternate long and two short dashes line in FIG. 5.

When the image plane is observed through the finder, the light shielding plates 31 and 32 are driven outwardly by the rotary plungers 33 and 34 and are located at the opening positions indicated by broken lines in FIG. 5. When the film document data is read, the plates 31 and 32 are driven inwardly by the rotary plungers 33 and 34 and are located at the light shielding positions shown by solid lines in FIG. 5. When the light shielding plates 31 and 32 are located at the light shielding positions, they are closed with a slit portion 31b of a width w in such a manner that only a part of the film document which faces the light receiving portion of the sensor 11 is illuminated. The remaining portion of the film document is light shielded by the light shielding plates 31 and 32. In this manner, the deterioration of the picture quality of the readout image data due to the ghost, flare, and the like can be minimized. 1 represents an optical axis similarly to that in FIG. 3.

Figure 6:
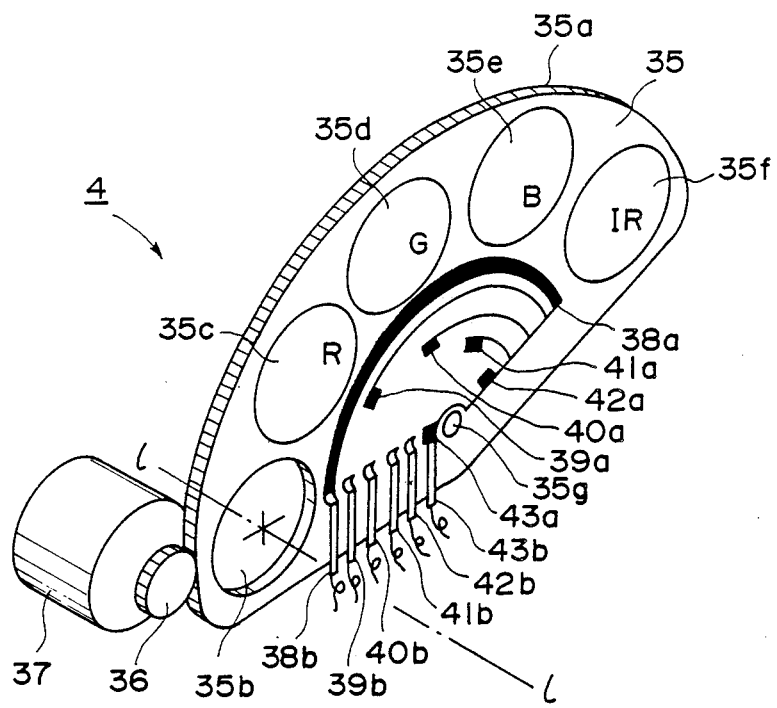
FIG. 6 is a perspective view showing an example of a filter exchanging mechanism 4 in FIG. 3.

FIG. 6 shows a detailed construction of the filter exchanging mechanism 4 in FIG. 3. In this diagram, a filter holder 35 holds color filters or the like, which are inserted into the optical path 1—1. The filter holder 35 is rotatably supported by a supporting axis 35g. The filter holder 35 is provided with a pass-through unit 35b which is used when the user observes the image plane through the finder, and color separation filters 35c, 35d, and 35e of R(red), G(green), and B(blue), respectively. Further, an IR (infrared) filter 35f having the visible light cut characteristic is attached to the filter holder 35 in order to detect the dust and scratch of the film document and optical system.

A gear 35a is formed on the circumferential portion of the semicircular filter holder 35. When a motor 37 is driven, the filter holder 35 is rotated through a gear 36 having a small diameter and through the gear 35a having a large diameter which is come into engagement with the gear 36. Thus, one of the passthrough unit 35b and the filter units 35c, 35d, 35e, and 35f of R, G, B, and IR is selectively inserted into the optical path 1—1.

On the other hand, patern electrodes 38a, 39a, surface of the filter holder 35 in order to detect the position of the filter which is inserted into the optical path 1—1. Namely, the electrode 43a is arranged in correspondence to the position of the pass-through unit 35b. The electrode 39a is arranged in correspondence to the position of the R filter 35c. The electrode 40a is arranged in correspondence to the position of the G filter 35d. The electrode 41a is arranged in correspondence to the position of the B filter 35e. The electrode 42a is arranged in correspondence to the position of the IR filter 35f. Those pattern electrodes are made conductive, respectively.

Further, brushes 38b, 39b, 40b, 41b, 42b, and 43b are arranged in correspondence to the pattern electrodes 38a, 39a, 40a, 41a, 42a, and 43a, respectively. Now, assuming that the brush 38b which always comes into contact with the electrode 38a is set to the ground level (earth potential), if the pass-through unit 35b is inserted into the optical path as shown in FIG. 6, the brush 43b will be set to a low level. If the R filter 35c is inserted, the brush 39b will be set to a low level. If the G filter 35d is inserted, the brush 40b will be set to a low level. If the B filter 35e is inserted, the brush 41b will be set to a low level. If the IR filter 35f is inserted, the brush 42b will be set to a low level. 1—1 denotes an optical axis similar to that in FIG. 3.

Figure 7:
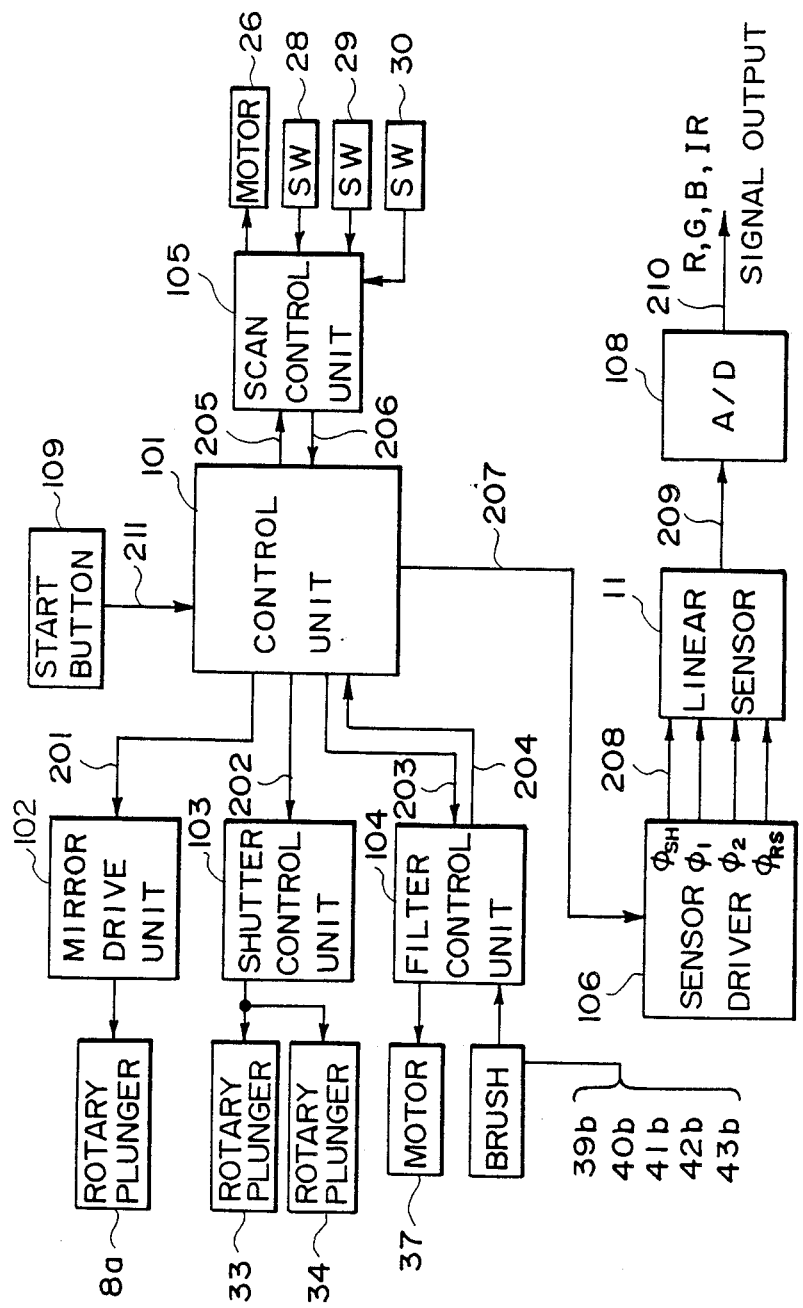
FIG. 7 is a block diagram showing a circuit block diagram of a color scanner in FIG. 3.
Figure 9:
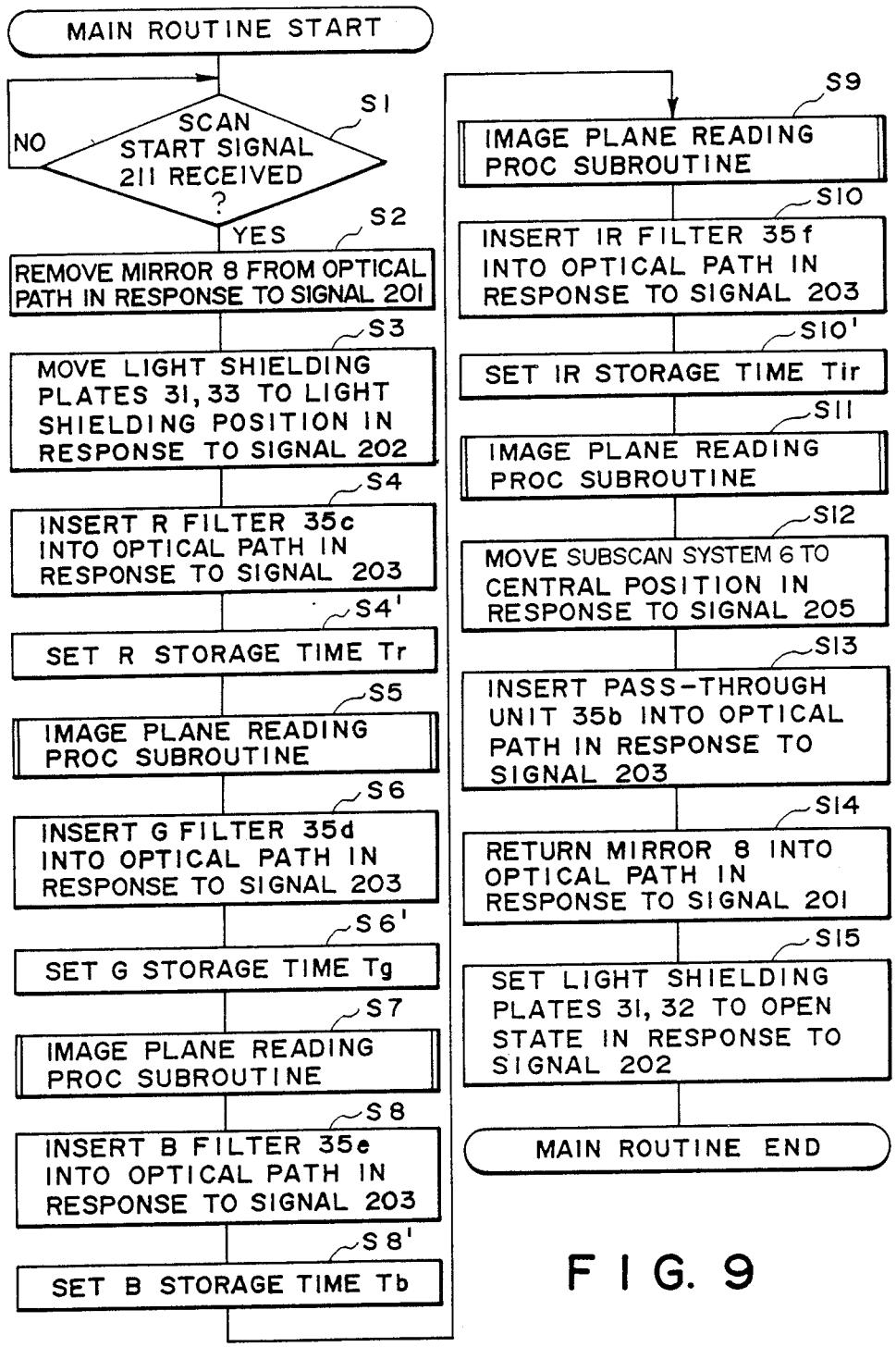
FIGS. 9 and 10 are flowcharts showing a control procedure of a control unit 101 in FIG. 7.
Figure 10:
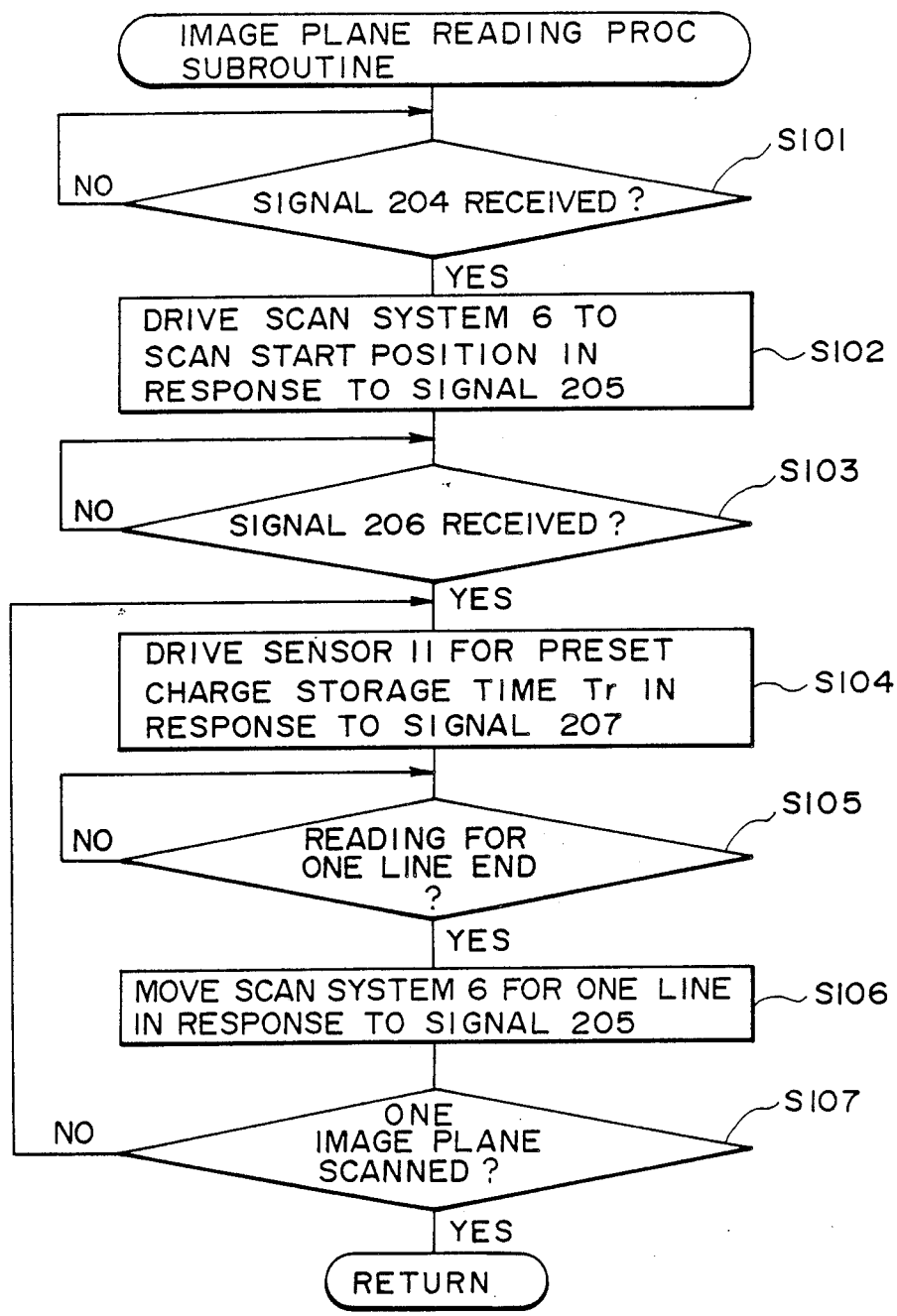

FIG. 7 shows a circuit block diagram of the film scanner in the first embodiment of the invention shown in FIG. 3. In FIG. 7, numeral 101 denotes a control unit to control the motors and sensors in accordance with a control procedure as shown in FIGS. 9 and 10. Numeral 102 denotes a mirror drive unit to drive a rotary plunger 8a to open or close the mirror 8; 103 is a shutter control unit to drive the rotary plungers 33 and 34 of the shutter mechanism 5; 104 a filter control unit to drive the motor 37 of the filter exchanging mechanism 4; 105 a scan control unit to drive the motor 26 of the sub scan system 6; 106 a sensor driver to drive the linear sensor 11; and 108 an A/D (analog to digital) converter to sequentially convert the analog output of the linear sensor 11 of the self scan type such as a CCD or the like into the digital signal.

FIG. 8 shows an output timing of a main control signal of the sensor driver 106 in FIG. 7. In the diagram, $\phi_{SH}$ denotes a charge shift clock; $\phi_1$ and $\phi_2$ are charge transfer clocks; and $\phi_{RS}$ is a reset clock. The sensor driver 106 controls charge storage periods Tr, Tg, Tb, and Tir upon reading of the R, G, B and IR image information in such a manner that the image outputs of the R, G, B, and IR which are obtained from the sensor 11 are set to the saturation levels in the case of the transmission light quantity of the orange components (base color) of the film document.

Figure 11:
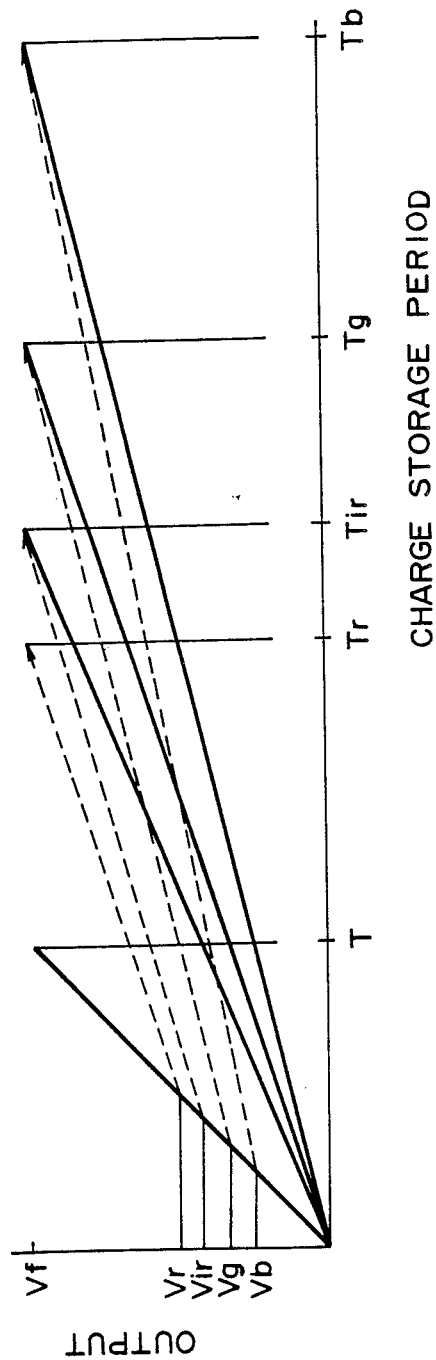
FIG. 11 is a diagram showing a method of determining a charge storage period which is preset to the control unit 101.

FIG. 11 shows a method of deciding the charge storage periods which are preset in the control unit 101. In FIG. 11, an axis of abscissa indicates the storage period and an axis of ordinate represents the output of the sensor 11. As shown in FIG. 11, the sensor 11 is driven at a predetermined storage period T in order to measure the orange base. In this case, the storage period T is determined in such a manner that the density 0 is set to the saturation output voltage Vf of the sensor 11. The storage period of the sensor 11 is controlled in accordance with the ratios Vf/Vr, Vf/Vg, Vf/Vb, and Vf/Vir of the saturation output Vf to the outputs Vr, Vg, Vb, and Vir of the orange base components of the negative film when the R, G, B, and IR filters are inserted into the optical paths. Practically speaking, when the R, G, B, and IR images are read, the storage periods are controlled so as to satisfy the following expressions $Tr=T\times Vf/Vr$, $Tg=T\times Vf/Vg$, $Tb=T\times Vf/Vb$, and $Tir=T\times Vf/Vir$. The respective orange base components are output as the saturation output Vf.

The storage periods Tr, Tg, Tb, and Tir are stored as the preset data in the control unit 101.

The operation of the embodiment of the invention will now be described in detail hereinafter with reference to the flowcharts in FIGS. 9 and 10.

When the film document is observed through the finder with the naked eye, the mirror 8 is located in the optical path 1—1 and the center of the film document holder 27 of the sub scan system 6 is located at the central position of the optical path. The light shielding plates 31 and 32 of the shutter mechanism 5 are open. Further, the pass-through unit 35b of the filter exchanging mechanism 4 is inserted in the optical path. In this state, the user (operator) confirms the image state of the film document by observing the image formed on the focusing plate 9 of the finder.

Next, when a start button 109 is pressed, a scan start signal 211 is generated (in step S1). Then, the control unit 101 first outputs a mirror drive signal 201 to the mirror drive unit 102, thereby removing the mirror 8 from the optical path by the rotary plunger 8a (step S2). Subsequently, a shutter drive signal 202 is output from the control unit 101 to the shutter control unit 103, and the light shielding plates 31 and 32 of the shutter mechanism 5 are driven to the light shielding positions by the pair of rotary plungers 33 and 34, thereby shielding the harmful lights such as ghost, flare, and the like (step S3).

At the same time, the control unit 101 outputs a filter control signal 203 to the filter control unit 104, thereby selectively inserting the color separation filter into the optical path. Assuming that the image data of R, G, B, and IR are sequentially read, the filter control unit 104 first drives the motor 37 in response to the filter control signal 203 until the R filter 35c is inserted into the optical path, i.e., until the brush 39b is set to the low level (step S4).

When the brush 39b is set to the low level, the filter control unit 104 returns a filter exchange end signal 204 indicative of the end of the filter change to the control unit 101.

In step S4', the control unit 101 obtains the output Vr by reading the orange base portion in the outside of, for example, the perforation by the sensor 11 for the storage time T and sets the R reading storage period Tr on the basis of the foregoing equation.

In the subroutine in the next step S5, when the control unit 101 receives the filter exchange end signal 204 (step S101), it transmits a scan start signal 205 to the scan control unit 105. When the scan control unit 105 receives the scan start signal 205, it first drives the step motor 26 until the sub scan system (carriage) 6 is moved to the scan start position, namely, until the switch 30 is turned ON (step S102). When the switch 28 is turned ON, the scan control unit 105 determines that the scan has been finished and returns a scan end signal 206 to the control unit 101. In this manner, the preparing operations to scan the film document are finished.

After the control unit 101 received the scan end signal 206 (step S103), it outputs a reading start signal 207 to the sensor driver 106. The sensor driver 106 then drives the sensor 11 for the charge storage time Tr set in step S4' in response to the reading start signal 207 in order to read the R image information (step S104). An output signal (image signal) 209 of the sensor 11 is sequentially converted into digital signals by the A/D converter 108 and sent to an image processor not shown. After the sensor 11 transmitted the output signal 209 as many as a predetermined number of pixels, the reading operation for one line is finished.

When the reading operation for one line is completed (step S105), the control unit 101 outputs the scan start signal 205 to the scan control unit 105, and the scan control unit 105 drives the pulse motor 26 by a predetermined number of pitches in response to the scan start signal 205, and the sub scan for one line of the sub scan system 6 is finished (step S106).

Thereafter, the processing routine is returned to step S104 and the sensor 11 is driven to read the image signal (R signal) of one line in a manner similar to the above. By repeating a predetermined number of cycles (corresponding to one image plane) of the reading processing operations in steps S104 to S106 mentioned above (step S107), the reading operation of the R image data is finished.

Next, the processing routine is returned to the main routine and step S6 follows. The control unit 101 makes the filter control unit 104 operative by the filter control signal 203 in order to exchange the color separation filter. Motor 37 is drive until the G filter 35d is located into the optical path 1—1, namely, until the brush 40b is set to the low level (step S6). In step S6', the control unit 101 sets the G reading storage period Tg in a manner similar to step S4'.

After the G filter 35d was selected as explained above, step S7 follows. By repeating the processing cycle (steps S101 to S107 in FIG. 10) similar to the cycle to read the R image plane explained above, the G image plane data is read.

The B image plane data and the IR image plane data are also read by the linear sensor 11 similarly to the above (steps S8, S8', S9, S10, S10', and S11), thereby completing the reading operation of the one image plane data of the film document.

After completion of the reading operation of one image plane data, the control unit 101 makes the scan control unit 105 operative by the scan start signal 205, thereby moving the sub scan system 6 to the central position of the sub scan by the rotation of the motor 26 (step S12). After the sub scan system 6 was located at the central position, i.e., after the switch 29 was turned ON, the motor 37 is driven through the filter control unit 104 by the filter control signal 203, thereby inserting the pass-through unit 35b into the optical path (step S13). The mirror drive unit 102 is made operative by the mirror drive signal 201 and the mirror 8 is returned into the optical path (step S14). The rotary plungers 33 and 34 are driven through the shutter control unit 103 by the shutter drive signal 202, thereby opening the light shielding plates 31 and 32 (step S15). in this manner, a series of processing operations to read the image plane data of the film document are completed.

In this embodiment, the output level of the sensor 11 is adjusted by actually measuring the charge storage periods Tr, Tg, Tb, and Tir of the sensor 11 as shown in FIG. 8. However, the similar effect can be derived even when the output level is adjusted by the use of the values which have previously been obtained and stored for every kind of film.

As described above, according to the first embodiment of the invention, the output level of the image reading sensor is controlled in such a manner that the orange components (base color) of the negative film are set to the output of almost the saturation level. Therefore, the following typical effects can be derived.

(1) The dynamic range of the sensor can be effectively used.

(2) When the negative image is reversed to the positive image, there is no need to consider the base color of the negative film.

The second embodiment of the invention will now be described with reference to FIG. 12 and subsequent drawings. In the second embodiment, the configuration of the film scanner, shutter mechanism 5, and filter exchanging mechanism 4, the control timing chart of the sensor driver 106, and the subroutine for the image plane reading processes in the control operating flow are substantially the same as those in the first embodiment mentioned above; therefore, the drawings of FIGS. 3, 4, 5, 6, 8 and 10 and their descriptions are omitted here.

Figure 12:
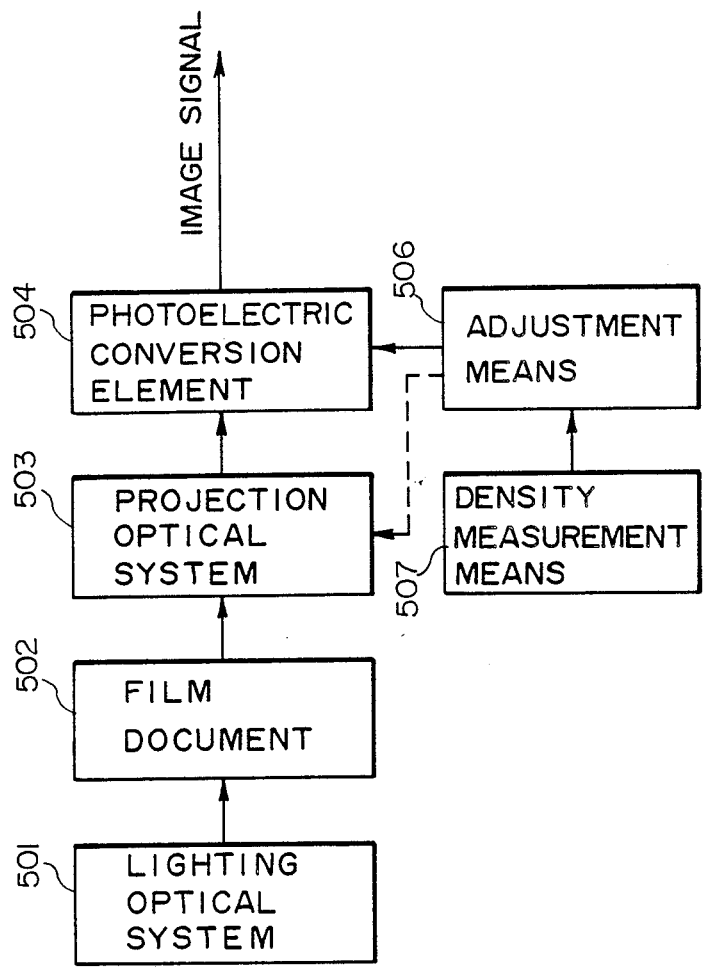
FIG. 12 is a block diagram showing a fundamental constitution of the second embodiment.

FIG. 12 shows a fundamental configuration of the second embodiment of the invention.

In FIG. 12, 501 denotes the lighting optical system such as a lamp or the like; 502 is the film document which is illuminated by the lighting optical system; 503 is the projection optical system to lead the image of the film document 502 to the photoelectric conversion element 504; density measurement means 507 for measuring a density of the base portion of the document, such as a transmission light quantity or the like of the unexposed portion of the negative film; and 506 control means for controlling the output level of the photoelectric conversion element 504. The gain of the output of the photoelectric conversion element is controlled in accordance with the amount measured by the density measurement means 507.

The second embodiment will now be described in detail hereinbelow. As previously mentioned, a diagram of the film scanner in the second embodiment is similar to FIG. 3. A part of the sub scan system 6 differs from that in the first embodiment. Namely, as shown in FIG. 13, the sub scan system 6 is arranged at the position corresponding to the unexposed portion of the film, for example, the position in the outside of the perforation. The sub scan system 6 has a photoelectric conversion element 50 of the photoelectromotive type to measure a transmission light quantity of the orange base portion of the negative film and controls the charge storage time of the CCD sensor on the basis of the output of the element 50.

The circuit block diagram of the second embodiment will now be described with reference to FIG. 14.

Figure 14:
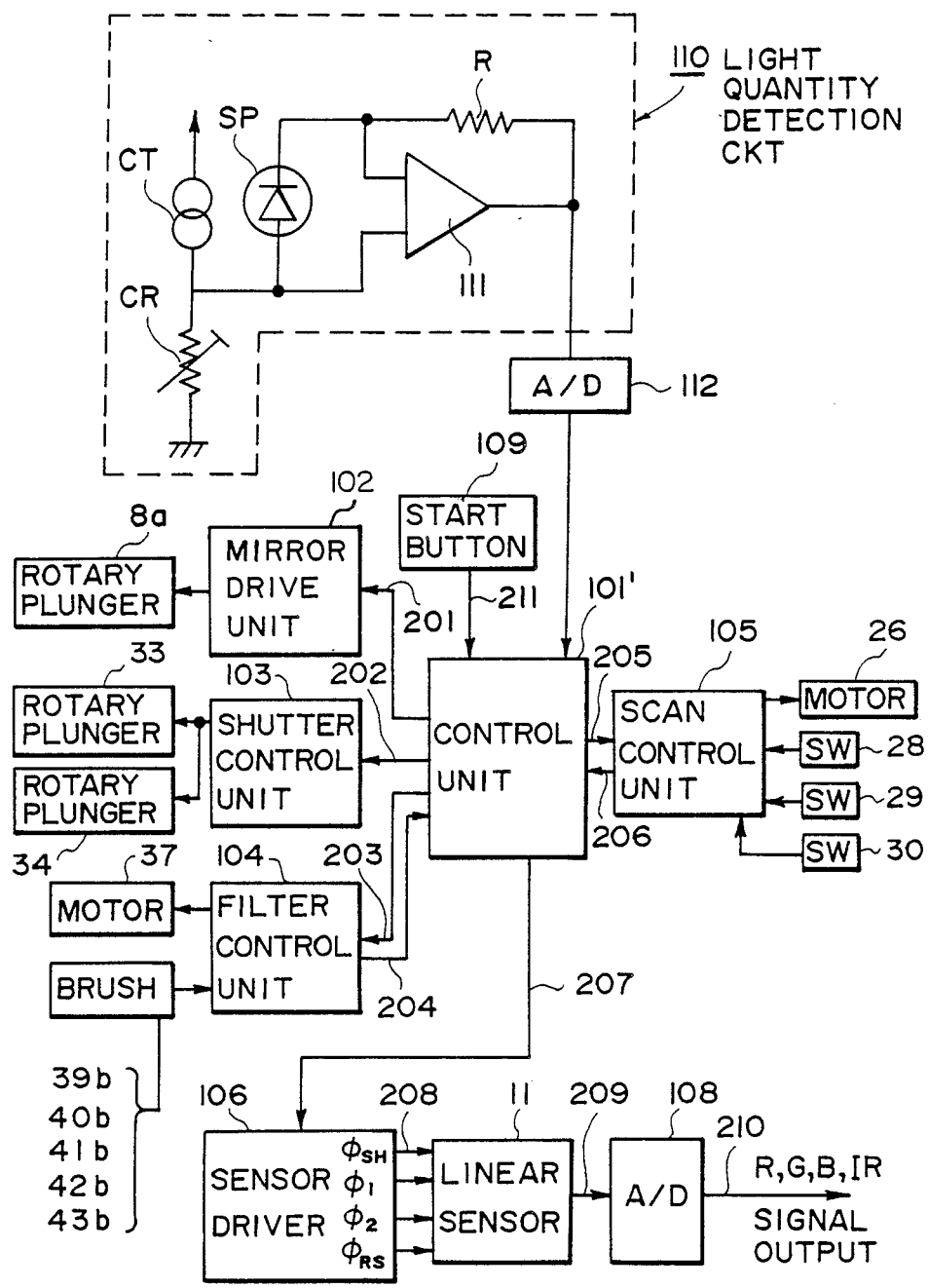
FIG. 14 is a block diagram showing a circuit constitution of a color scanner in the second embodiment.
Figure 15:
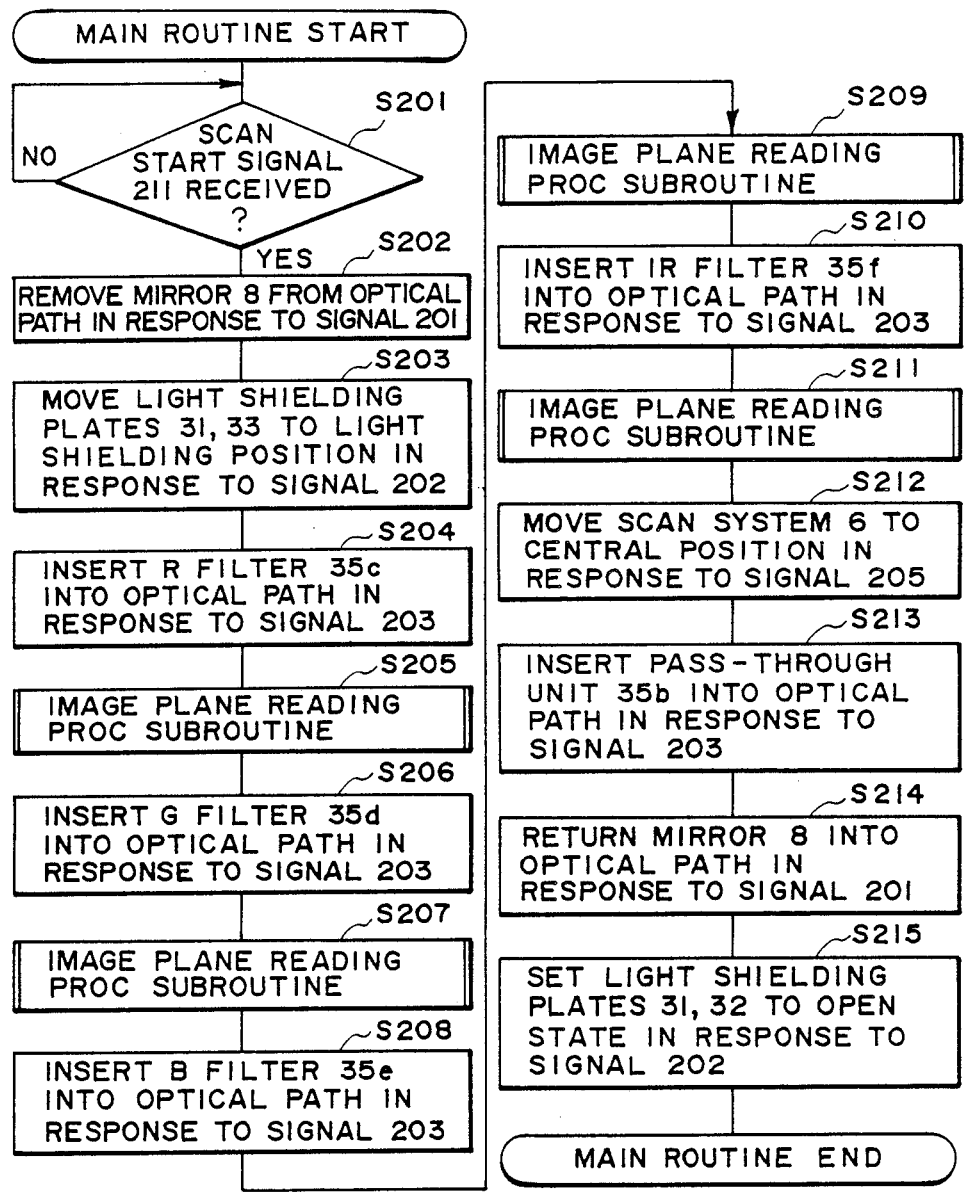
FIGS. 15 and 16 are flowcharts showing a control procedure of a control unit 101' in FIG. 14.
Figure 16:
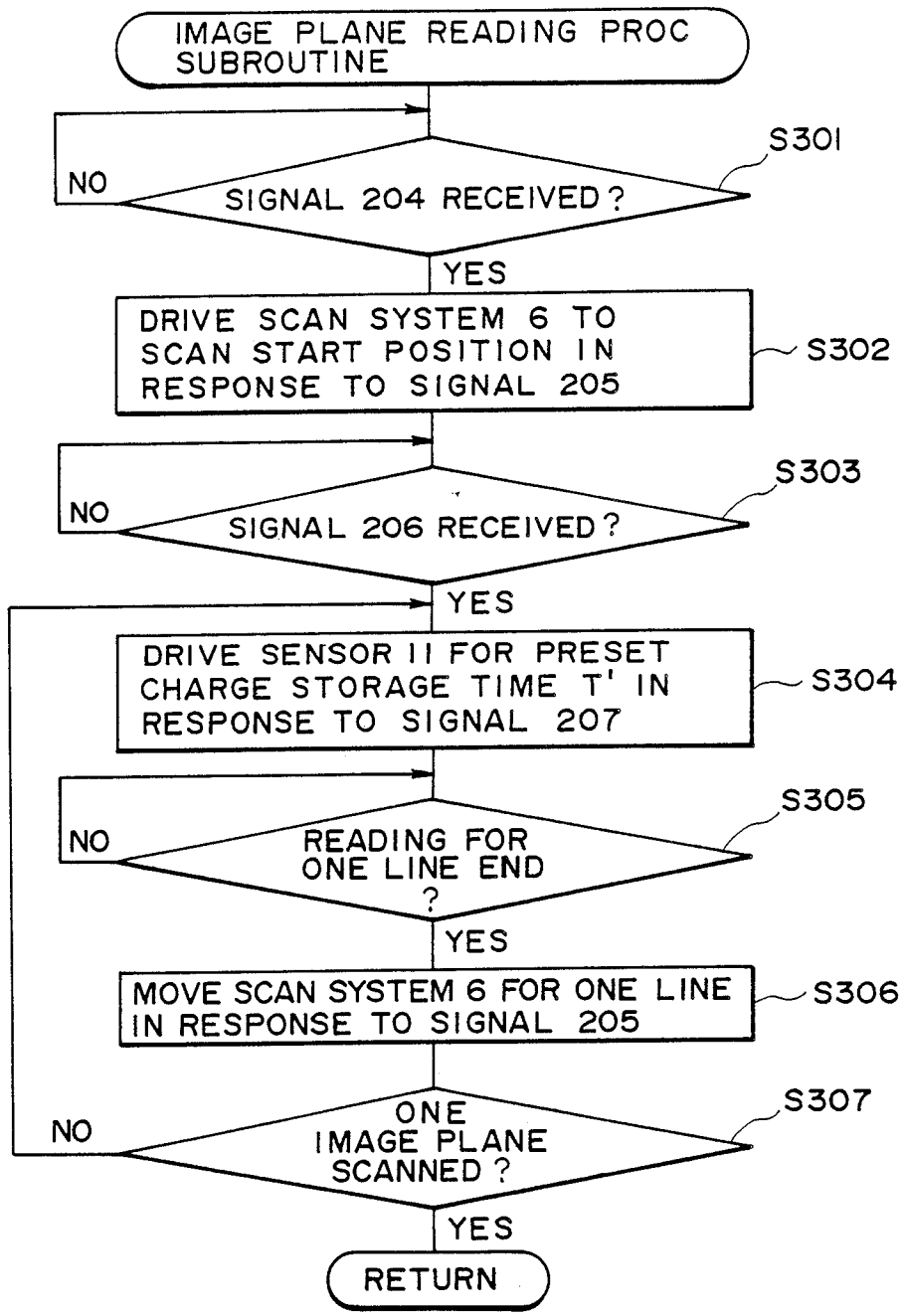

In FIG. 14, a control unit 101' controls the motors and sensors in accordance with a control procedure as shown in FIGS. 15 and 16. Reference numeral 102 denotes the mirror drive unit to drive the rotary plunger 8a to open or close the mirror 8; 103 is the shutter control unit to drive the rotary plungers 33 and 34 of the shutter mechanism 5; 104 the filter control unit to drive the motor 37 of the filter exchanging mechanism 4; 105 the scan control unit to drive the motor 26 of the sub scan system 6; 106 the sensor driver to drive the output of the linear sensor 11; and 108 the A/D (analog to digital) converter to sequentially convert the analog output of the linear sensor 11 of the self scan type such as the CCD or the like into the digital signal. The above components are the same as those in FIG. 7.

Numeral 110 denotes a light quantity detection circuit comprising: the photoelectromotive type photoelectric conversion element SP (indicated at 50 in FIG.

13); a photometric operational amplifier (OP) 111; a resistor R; a constant current source CT; and a bias level setting resistor CR. The detection circuit 110 measures a quantity of light transmitted through the unexposed portion of the film. The light quantity detected by the detection circuit 110, i.e., the analog output of the amplifier 111 is converted into the digital signal by an A/D converter 112 and led as the digital data to the control unit 101'. The digital data is arithmetically operated together with the preset data by the control unit 101'. The sensor drive control signal (i.e., reading start signal) 207 is supplied to the sensor driver 106 on the oasis of the result of the arithmetic operation.

Since the main control signal of the sensor driver 106 is similar to that in FIG. 8, its description is omitted.

The light quantity detection circuit 110 is constituted so as to obtain the output which is linearly proportional to the light quantity. Therefore, for example, when the transmission light quantity of the film is doubled, the output of the amplifier 111 is also doubled. However, the image signal 209 which is obtained from the linear sensor 11 can be always set to the output signal of a predetermined level by configuring the control unit 101' in such a manner that an image storage period T' of the charge shift clock $\phi_{SH}$ shown in FIG. 8 is reduced to the half period in inversely proportional to the transmission light quantity of the film.

Next, the operation or the second embodiment of the invention will now be described in detail with reference to a flowchart of FIG. 15.

When the user observes the film document by the naked eye through the finder, the mirror 8 is located in the optical path 1—1, the center of the film document holder 27 of the sub scan system 6 is located at the central position of the optical path, and the light shielding plates 31 and 32 of the shutter mechanism 5 are open. Further, the pass-through unit 35b of the filter exchanging mechanism 4 is inserted in the optical path. In this state, the user (operator) confirms the image state of the film document by observing the image formed on the focusing plate 9 of the finder.

Next, when the start button 109 is pressed, the scan start signal 211 is generated (step S201). The control unit 101' first outputs the mirror drive signal 201 to the mirror drive unit 102, thereby removing the mirror 8 from the optical path by the rotary plunger 8a (step S202). Subsequently, the control unit 101' outputs the shutter drive signal 202 to the shutter control unit 103, and the light shielding plates 31 and 32 of the shutter mechanism 5 are driven to the light shielding positions by the pair of rotary plungers 33 and 34, thereby shielding the harmful lights such as ghost, flare, and the like (step S203).

At the same time, the control unit 101' outputs the filter control signal 203 to the filter control unit 104, thereby selectively inserting either one of the color separation filters into the optical path. Now, assuming that the image data is sequentially read in accordance with the order of R, G, B, and IR, the filter control unit 104 first drives the motor 37 in response to the filter control signal 203 until the R filter 35c is inserted into the optical path, i.e., until the brush 39b is set to the low level (step S204).

When the brush 39b is set to the low level, the filter control unit 104 returns the filter exchange end signal 204 indicative of the end of exchange of the filter to the control unit 101'. In the subroutine in step S205, when the control unit 101' receives the filter exchange end signal 204 (step S301), it transmits the scan start signal 205 to the scan control unit 105. When the scan control unit 105 receives the scan start signal 205, it first drives the step motor 26 until the sub scan system (carriage) 6 is moved to the scan start position, i.e., until the switch 30 is turned ON (step S302). When the switch 28 is turned ON, the scan control unit 105 determines the end of scan and returns the scan end signal 206 to the control unit 101'. The preparing operations to scan the film document are finished.

In this case, the photoelectric conversion element SP of the photoelectromotive type (indicated at 50 in FIG. 13) is located in the illuminating range. The light quantity detection circuit 110 measures the transmission light quantity in the outside of the perforation (film feed holes) of the film, i.e., in the unexposed portion (pure orange base portion) of the film with respect to R, G, B, and IR. On the basis of the measured data, the control unit 101' controls the storage period T' of the linear sensor 11 with regard to R, G, B, and IR, respectively, in such a manner that a storage charge amount is set to the saturation level when the sensor 11 scans the orange base portion.

When the control unit 101' receives the scan end signal 206 (step S303), it outputs the reading start signal 207 to the sensor driver 106. In response to the start signal 207, the sensor driver 106 generates the drive signal 208 to the sensor 11 and drives the sensor 11 for the charge storage time T' in accordance with the output of the light quantity detection circuit 110 (step S304). The output signal (image signal) 209 of the sensor 11 is sequentially converted into the digital signal by the A/D converter 108 and sent to an image processor (not shown). After the sensor 11 transmitted the output signal 209 as many as a predetermined number of pixels, the reading operation for one line is finished.

After completion of the reading operation for one line (step S305), the control unit 101' outputs the scan start signal 205 to the scan control unit 105. In response to the scan start signal 205, the scan control unit 105 drives the pulse motor 26 by predetermined number of pitches and the sub scan for one line of the sub scan system 6 is finished (step S306).

Thereafter, the processing routine is returned to step S304 and the sensor 11 is driven similarly to the above, thereby reading out the image signal (R signal) of one line. By repeating the foregoing reading processing operations in steps S304 to S306 by predetermined number of cycles (corresponding to one image plane) (step S307), the reading operation of the R image data is completed.

Next, the processing routine is returned to the main routine and step S206 follows. The control unit 101' makes the filter control unit 104 operative by the filter control signal 203 in order to change the filter, thereby driving the motor 37 until the G filter 35d is located in the optical path 1—1, namely, until the brush 40b is set to the low level (step S206).

After the G filter 35d was selected in this manner, step S207 follows and by repeating the processing cycle (steps S301 to S307 in FIG. 16) similar to the reading cycle of the R image plane mentioned above, the G image plane data is read.

The B image plane data and the IR image plane data are also read out by the linear sensor 11 (in steps S208, S209, S210, and S211) in a manner similar to the above.

Thus, the reading operations of one image plane of the film document are completed.

After completion of the reading operations of one image plane, the control unit 101' makes the scan control unit 105 operative by the scan start signal 205, thereby moving the sub scan system 6 to the central position of the sub scan by the rotation of the motor 26 (step S212). After the sub scan system 6 was moved to the central position, namely, after the switch 29 was turned ON, the motor 37 is driven by the filter control signal 203 through the filter control unit 104, thereby inserting the pass-through unit 35b into the optical path (step S213). The mirror drive unit 102 is driven by the mirror drive signal 201, thereby returning the mirror 8 into the optical path (step S214). The rotary plungers 33 and 34 are made operative by the shutter drive signal 202 through the shutter control unit 103, thereby opening the light shielding plates 31 and 32 (step S215). A series of processing operations to read the image plane of the film document are completed in this manner.

In this embodiment, when the light quantity in the unexposed portion of the negative film is measured, the transmission light quantity in the outside of the film perforation is measured. However, the invention is not limited to this method. The similar effect can be also obviously derived even if the transmission light quantity in the other unexposed portion of the film, e.g., in the portion between the image planes is measured.

On the other hand, the similar effect can be also derived even if the storage time T' of the CCD sensor is controlled on the basis of the level of the output signal of a special pixel corresponding to the unexposed portion of the film of the CCD sensor.

Further, the similar effect can be also obtained even if the illuminance of the light receiving surface of the CCD sensor is controlled on the basis of the light quantity of the unexposed portion of the film, for example, even if the diaphragm or the like of the projection optical system is controlled in place of controlling the storage time.

As described above, according to the second embodiment of the invention, the output level of the image reading sensor has been controlled in accordance with the light quantity of the unexposed portion of the negative film. Therefore, the following typical effects can be derived.

(1) The dynamic range of the image reading sensor can be effectively used.

(2) The negative image can be reversed to the positive image without considering the base color of the negative film.

(3) The influence by the delicate color difference of the base color of the negative film which appears by various causes can be eliminated. A more accurate color can be reproduced.

As described above, according to the present invention, even when the positive image is obtained from the negative film, the image signal of a high picture quality can be derived without considering the base color of the negative film.

The present invention is not limited to the foregoing embodiments but many modifications and variations are possible within the spirit and scope of the appended claims of the invention.

What is claimed is:

1. An apparatus for reading film image information, comprising:
    a lighting optical system for illuminating a film document having color image information;
    photoelectric conversion means for converting the color image information into a plurality of different output color electric signals;
    detecting means for detecting, when a base of said film document is read, each level of the plurality of different output color electric signals output by said photoelectric conversion means; and
    adjustment means for adjusting the plurality of different output color electric signals output by said photoelectric conversion means, wherein said adjustment means controls storage periods of said photoelectric conversions means for obtaining the plurality of different output color electric signals on the basis of each level of the plurality of different output color electric signals detected by said detecting means.

2. An apparatus according to claim 1, further comprising color separation means for color-separating the color image information.

3. An apparatus according to claim 1, wherein the base of said film document is an unexposed portion of said film document.

4. An apparatus according to claim 1, wherein said adjustment means determines each storage period of said photoelectric conversion means in such a manner that the level of each of said plurality of different output color electric signals attains a saturation level when the base of said film document is read.

* * * * *